United States Patent [19]

Zado

[11] Patent Number: 4,701,224

[45] Date of Patent: Oct. 20, 1987

[54] WATER SOLUBLE CONDENSATION SOLDERING FLUX

[75] Inventor: Frank M. Zado, Lawrence Township, Mercer County, N.J.

[73] Assignee: American Telephone and Telegraph Company, AT&T Bell Laboratories, Murray Hill, N.J.

[21] Appl. No.: 854,462

[22] Filed: Apr. 21, 1986

[51] Int. Cl.$^4$ .............................................. B23K 35/34
[52] U.S. Cl. ........................................ 148/23; 148/24; 148/25
[58] Field of Search .................................... 148/23-25

[56] References Cited

U.S. PATENT DOCUMENTS

| | | | |
|---|---|---|---|
| 2,547,771 | 4/1951 | Pessel | 148/24 |
| 2,631,952 | 3/1953 | Williams | 148/25 |
| 3,272,861 | 9/1966 | Riggs | 148/25 |
| 3,309,239 | 3/1967 | Harris | 148/24 |
| 3,589,952 | 6/1971 | Burne | 148/24 |
| 3,597,285 | 8/1971 | Aronberg | 148/25 |
| 4,168,996 | 9/1979 | Zado | 148/23 |
| 4,194,931 | 3/1980 | Zado | 148/23 |
| 4,342,607 | 8/1982 | Zado | 148/23 |
| 4,478,650 | 10/1984 | Zado | 148/23 |

*Primary Examiner*—Peter D. Rosenberg
*Attorney, Agent, or Firm*—Joel F. Spivak

[57] ABSTRACT

A water soluble solder flux particularly suitable for use as a fusing fluid in condensation soldering operations has been developed. The invention involves the use of such flux in condensation soldering as well as the flux, per se. The novel flux comprises a water soluble flux vehicle comprising a resinated polyethylene oxide (polyene), together with at least one flux activator selected from a water soluble organic acid activator and a water soluble halide containing activator, and a solvent which is water soluble.

9 Claims, No Drawings

WATER SOLUBLE CONDENSATION SOLDERING FLUX

TECHNICAL FIELD

This invention relates to solder fluxes, the residues of which are water soluble and more specifically, to a water soluble flux particularly suitable for use with condensation soldering.

BACKGROUND OF THE INVENTION

In soldering electronic components, circuits, equipment and the like, various kinds of fluxes are used together with the solder so as to improve the efficiency of the soldering operation, to secure the soldered connections and to improve the long-term reliability of the connections while maintaining proper electrical performance. Conventionally, fluxes may be divided into three broad categories: (1) natural rosin; (2) activated (mildly or fully activated) rosin having a halogenated compound or organic acid activator incorporated with natural rosin; and (3) rosin free flux, generally referred to as water soluble or synthetic flux.

Natural rosin flux is a stable flux but results in a solid rosin flux residue which, if not completely removed, results in serious contact resistance problems in electronic relays, connectors, goldfingers and printed wiring board circuitry. Excessive rosin flux residues also prevent the adherence of protective coatings commonly applied to finished electronic circuit assemblies. This type flux is advantageous in that it presents few problems with respect to corrosiveness.

Activated rosin flux has a stability similar to natural rosin flux and causes little corrosion at room temperature. Fully activated fluxes have a strong fluxing action at soldering temperatures due to the activators added thereto. Such activators, e.g., amine hydrochlorides, are typically present in high concentrations such as 1 to 10 weight percent of the resultant flux. However, a fully activated rosin flux has disadvantages in that at soldering temperatures a corrosive gas is produced. Moreover, the residues of the activated rosin combine with moisture to produce corrosive acid. Presently available fluxes containing organic amine hydrohalides in the form of neutral salts such as glutamic acid hydrochloride, either form corrosive metal halides at elevated temperature or the residues thereof combine with moisture at room temperature to form a corrosive acid and thus are used with possible deleterious effects for electronic soldering applications.

There are also mildly activated rosin fluxes such as those taught in U.S. Pat. No. 4,168,996. While these are not corrosive, they still suffer from the same disadvantage of rosin flux in that the flux residue is difficult to remove.

Rosen free fluxes are very efficient in removing oxides from the metal surface to be soldered. They generally have the distinct advantage of being relatively easily removed from the device by washing with a suitable solvent, alkaline detergent or water. However, there are disadvantages to their use because they frequently contain either strong acids, such as hydrochloric acid or strong organic acids, or an inorganic salt which which hydrolizes in water to give an acid reaction. Therefore, they are apt to destroy metallic material or to leave residues which corrode the soldered parts after soldering, thereby resulting in decreased reliability of the soldered parts with respect to electrical and mechanical properties.

Furthermore, some rosin free fluxes comprise polyethylene glycol and/or its derivatives as a flux vehicle. It has been found that such fluxes interact with the polymeric surfaces of electronic devices, e.g. printed wiring boards, to modify them so that they become more conductive, thereby increasing still further the chances of device malfunctioning. The change in substrate surface quality with regard to conduction is measurable as a decrease in insulation resistance. For most soldering techniques, the above mentioned disadvantages have been substantially alleviated by a rosin free, water soluble flux as set forth in U.S. Pat. No. 4,342,607 when employing low or medium temperature soldering operations, e.g. 350 degrees to 500 degrees F. However, when the soldering operation is a higher temperature operation or for extended periods of time, or when greater flux activation is necessary, such as in infra red solder reflow or hot gas leveling techniques, greater thermal stability and/or flux activation is often required. Such high thermal stress exerted on the printed wiring board material makes the soldering process particularly sensitive to the proper choice of solder flux. Thermal problems associated with solder fluxes are exacerbated in condensation soldering with its inherently long duty cycle. For example, while materials to be soldered under more conventional soldering techniques such as wave soldering, are exposed to elevated temperatures for only two to three seconds, condensation soldering processes require much longer times, e.g., 25–40 seconds and sometimes even longer. To compensate for such a long duty cycle, a solder flux should be slow acting as compared with a prior art, faster acting water soluble fluxes. Only such slower action could reduce the otherwise severe corrosion problem which may be encountered. Even more importantly, I have discovered that many of the problems with prior art solder fluxes employed in condensation soldering are due to the decomposition of the condensation soldering fluids when in prolonged contact with the flux at elevated temperatures. The soldering fluxes used in condensation soldering gradually accumulate in the sump of the condensation soldering machine. Refluxing of the condensation soldering fluid for an extended period of time in the presence of solder flux chemicals leads to a noticeable decomposition of the condensation soldering fluid. Hence, it is important to obtain a flux formulation which is not only water soluble and slow acting, but that inhibits the decomposition of the condensation soldering fluids. Typical condensation soldering fluids are perfluorinated organic compounds having molecular weights of from 600–700. Examples of such fluids are perfluoroamylamine, perfluorophenanthrene and perfluoropolyethers.

SUMMARY OF THE INVENTION

A water soluble solder flux particularly suitable for use as a fusing fluid in condensation soldering operations has been developed. The invention involves the use of such flux in condensation soldering as well as the flux, per se. The novel flux comprises a water soluble flux vehicle comprising a resinated polyethylene oxide (polyene), together with at least one flux activator selected from a water soluble organic acid activator and a water soluble halide containing activator, and a solvent which is water soluble.

DETAILED DESCRIPTION

The present invention comprises a mildly acidic resinated polyene flux wherein the resin (e.g., an abietyl amine) is included in the polyene molecule. It has been found by including the abietyl amine in the polyene, e.g. a polyethylene oxide adduct of abietyl amine, the detrimental effects upon the condensation soldering fluids generally encountered with polyethylene glycol type fluxes is eliminated while preserving its miscibility with water. A commercially suitable material for use in the novel flux formulation is sold under the trade name Polyrad, a trademark of Hercules, Inc., Wilmington, Del. Polyrad is prepared by the process of chemical condensation of ethyelene oxide and dehydroabietyl amine where, typically, 5 to 11 ethylene oxide units are present for each nitrogen bond in the dehydroabietyl amine. A preferred constituent of the flux is one which contains 5 polyethylene oxide units per molecule. This preference is due to the viscosity and water solubility generally desired for the flux material. The exact nature of the inhibiting property of the novel flux vehicle containing the dehydroabietyl amine in the polyene molecule is not precisely known. However, it is observed that there is no longer any decomposition of the condensation soldering fluid when the polyene is modified with the dehydroabietyl amine as set forth. It should be understood that other resinated modifiers to the polyene may be substituted for the dehydroabietyl amine. For example, one may use conjugated cyclic amines such as phenanthrene amine, naphthylamine or anthronylamine to modify the polyene molecule.

FLUX ACTIVATORS

Flux activators are well known in the prior art and have been described, for example, in U.S. Pat. Nos. 4,342,607; 4,478,650; 4,168,996; and 4,194,931, all of which are incorporated herein by reference. Three types of activator moieties may be employed in the present invention. One is an organic acid activator. For the purpose of soldering of highly reliable electronic equipment where the final product cleanliness is of paramount importance, a halide free activator is generally preferred. The use of water soluble, strong mono, di, and tricarboxcylic organic acids such as acetic, glycolic, levulinic, citric, tartaric, oxallic, etc., has been found very beneficial. The combined effects of the acid's strength and its adequate solubility in water are factors of consideration.

Halide containing activators may be ionic or covalent. Ionic halides, due to their noted efficiency, e.g., alkyl ammonium chlorides and bromides, are very useful because they can be used at typically ten times lower concentrations than their organic acid activator analogues. Materials as, but not restricted to, diethylammonium chloride or cetyl trimethylammonium bromide are typical representatives of ionic halide activators. Typical concentrations of ionic halide activators in a flux formulation is within the range of 0.1 to 1.0% by weight. While an ionic halide activator concentration below 0.1% is not very effective, concentrations above 1.0% become too corrosive to be used in condensation soldering technology due to its long soldering duty cycle.

Covalently bound halides are well known in the prior art as activators. Although known as mild activators, being approximately 2 to 5 times less effective than ionic halide activators, their use is often severely restricted by the requirement of water solubility. For this reason the preferred choices are alpha-bromo derivatives of lower organic acids, e.g., dibromo succinic acid.

SOLVENTS

While many solvents are suitable provided they are both water soluble and will further dissolve the activator and flux vehicle, the isopropyl alcohol is generally preferred. Often, the use of other solvents along with isopropyl alcohol to allow for better flux application, e.g., by foaming, is well known in the art, e.g., see U.S. Pat. No. 4,194,931.

PREFERRED EMBODIMENTS

A preferred flux in accordance with the invention for use in condensation soldering contains 10 to 35 weight percent polyethylene oxide adduct of dehydroabietylamine, 0.1 to 1.0 weight percent alkyl ammonium chloride (or bromide), in an isopropyl alcohol solvent.

A second preferred solder flux composition employs 10 to 35 weight percent polyethylene oxide adduct of dehydroabietylamine, 0.5 to 5 weight percent of low molecular weight organic acids and the balance being isopropyl alcohol.

A third preferred flux formulation contains 10 to 35 weight percent polyethylene oxide adduct of dehydroabietylamine, 0.3 to 1 weight percent of an alkyl bromo acid activator, and the balance being isopropyl alcohol.

CONDENSATION SOLDERING

In condensation soldering, the article to be soldered, fused or brazed is placed in hot saturated vapors generated by continuously boiling a heat transfer fluid having a boiling point somewhat above that required for solder flow, fusing or brazing as the case may be. Vapors condense on the article and give up latent heat of vaporization to heat the article to the desired temperature. The condensed fluid collects in a sump and is reheated. As in normal soldering, fusing or brazing operations, a flux must generally be applied to the surface of the article to provide and/or produce a clean, oxide free surface for the operation. A more detailed description of the condensation soldering process and apparatus suitable therefor can be found with reference to U.S. Pat. No. 3,866,307 which is incorporated herein by reference.

What is claimed is:

1. In the process of condensation soldering for solder, fusing or brazing an article, the step consisting essentially of applying a mildly acidic resinated polyene flux to the article, said flux comprising a water soluble flux vehicle, at least one water soluble flux activator and a water miscible solvent therefor, said vehicle comprising a resinated adduct of a polyene derived from the condensation of an alkylene oxide with a conjugated polycyclic amine.

2. In the condensation soldering process described in claim 1, wherein the polyene is a polyethylene oxide.

3. In the process described in claim 1, wherein said cyclic amine is selected from the group consisting of phenanthrene amine, naphthyl amine, abietyl amine and anthronyl amine.

4. In the process as described in claim 1, wherein said conjugated polycyclicamine is abietyl amine.

5. In the process recited in claim 4, wherein said alkylene oxide is ethylene oxide.

6. In the process recited in claim 5, wherein said resinated adduct of a polyene is derived from the condensation of ethylene oxide and dehydroabietyl amine wherein 5–11 ethylene oxide units are present for each amine group.

7. In the process recited in claim 1, wherein said flux further includes at least one activator selected from a water soluble organic acid activator and the water soluble halide containing activator.

8. In the process recited in claim 7, wherein said flux is dissolved in isopropyl alcohol.

9. A condensation soldering process for soldering, fusing or brazing an article comprising the steps of applying a flux to the article, said flux comprising from 10 to 35 weight percent of a polyethylene oxide adduct of dehydroabietyl amine, at least one activator selected from the group consisting of 0.1 to 1.0 weight percent of an alkyl ammonium halide, 0.5 to 5 weight percent of a low molecular weight organic acid and 0.3 to 1 weight percent of an alkyl bromo acid activator, in an isopropyl alcohol based solvent, and immersing said fluxed article in a condensation soldering apparatus so as to expose said article to the condensation soldering fluid whereby said article is heated in preparation for said soldering, fusing or brazing and applying any appropriate solder, fusing or brazing materials to said heated article.

* * * * *